United States Patent
Helland et al.

(10) Patent No.: US 6,678,696 B1
(45) Date of Patent: Jan. 13, 2004

(54) TRANSACTION PROCESSING OF DISTRIBUTED OBJECTS WITH DECLARATIVE TRANSACTIONAL ATTRIBUTES

(75) Inventors: Patrick James Helland, Redmond, WA (US); Rodney Limprecht, Woodinville, WA (US); Mohsen Al-Ghosein, Issaquah, WA (US); Wilfred G. Russell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/225,896

(22) Filed: Jan. 4, 1999

Related U.S. Application Data

(63) Continuation of application No. 08/959,141, filed on Oct. 28, 1997, now Pat. No. 5,890,161.

(51) Int. Cl.⁷ .............................................. G06F 17/00
(52) U.S. Cl. .................... 707/103 R; 707/103; 707/200
(58) Field of Search .............. 707/1–206; 709/200–207, 709/223, 226

(56) References Cited

U.S. PATENT DOCUMENTS

| | | |
|---|---|---|
| 4,752,928 A | 6/1988 | Chapman et al. |
| 4,972,437 A | 11/1990 | Citron et al. |
| 5,278,982 A | 1/1994 | Daniels et al. |
| 5,301,280 A | 4/1994 | Schwartz et al. |
| 5,455,953 A | 10/1995 | Russell |
| 5,481,715 A | 1/1996 | Hamilton et al. |
| 5,524,238 A | 6/1996 | Miller et al. |
| 5,561,797 A | 10/1996 | Gilles et al. |
| 5,577,252 A | 11/1996 | Nelson et al. |
| 5,606,719 A | 2/1997 | Nichols et al. |
| 5,619,710 A | 4/1997 | Travis, Jr. et al. |
| 5,625,775 A | 4/1997 | Davis et al. |
| 5,689,708 A | 11/1997 | Regnier et al. |
| 5,706,429 A | 1/1998 | Lai et al. |
| 5,717,439 A | 2/1998 | Levine et al. |
| 5,765,174 A | 6/1998 | Bishop et al. |
| 5,778,365 A | 7/1998 | Nishiyama |
| 5,781,910 A | 7/1998 | Gostanian et al. |
| 5,790,789 A | 8/1998 | Suarez |
| 5,815,665 A | 9/1998 | Teper et al. |
| 5,822,435 A | 10/1998 | Boebert et al. |

(List continued on next page.)

OTHER PUBLICATIONS

Cheng, Scheduling transactions in real–time database systems, Compcon Spring '93, Digest of Papers, Feb. 22–26, 1993, pp. 222–231.*

Lin et al., I–Structure Software Cache: a split–phase transaction runtime cache system, Parallel Architectures and Compilation Techniques, 1996, Proceedings of the 1996 Conference on, Oct. 20–23, 1996, pp. 122–126.*

(List continued on next page.)

Primary Examiner—David Jung
(74) Attorney, Agent, or Firm—Klarquist Sparkman, LLP

(57) ABSTRACT

A component-based framework includes system services and component integration interfaces that provide a run-time environment which automatically processes work of component-based server applications in transactions according to transactional rules or behaviors declaratively specified to apply to the respective components. A transaction attribute is declaratively specified for a server application component that represents whether the component requires execution in a transaction. When a client requests creation of a server application component without having first initiated a transaction and the component's transaction attribute indicates a transaction is required, the framework automatically initiates a transaction in which to run the server application component. The framework also completes the automatically initiated transaction upon receiving an indication from the server application component that its transactional work is complete.

61 Claims, 4 Drawing Sheets

U.S. PATENT DOCUMENTS

| | | |
|---|---|---|
| 5,822,585 A | 10/1998 | Noble et al. |
| 5,832,274 A | 11/1998 | Cutler et al. |
| 5,838,916 A | 11/1998 | Domenikos et al. |
| 5,857,197 A | 1/1999 | Mullins |
| 5,857,201 A | 1/1999 | Wright, Jr. et al. |
| 5,864,669 A | 1/1999 | Osterman et al. |
| 5,864,683 A | 1/1999 | Boebert et al. |
| 5,875,291 A | 2/1999 | Fox |
| 5,881,225 A | 3/1999 | Worth |
| 5,884,316 A | 3/1999 | Bernstein et al. |
| 5,884,327 A | 3/1999 | Cotner et al. |
| 5,889,942 A | 3/1999 | Orenshteyn |
| 5,889,957 A | 3/1999 | Ratner et al. |
| 5,907,675 A | 5/1999 | Aahlad |
| 5,913,061 A | 6/1999 | Gupta et al. |
| 5,933,593 A | 8/1999 | Arun et al. |
| 5,941,947 A | 8/1999 | Brown et al. |
| 5,958,004 A | 9/1999 | Helland et al. |
| 5,958,010 A | 9/1999 | Agarwal et al. |
| 6,061,796 A | 5/2000 | Chen et al. |
| 6,094,688 A | 7/2000 | Mellen-Garnett et al. |
| 6,105,147 A | 8/2000 | Molloy |
| 6,499,028 B1 * | 12/2002 | Brock et al. .................. 707/4 |
| 6,553,384 B1 * | 4/2003 | Frey et al. .................. 707/103 |
| 6,609,128 B1 * | 8/2003 | Underwood ................. 707/10 |

OTHER PUBLICATIONS

Tsai et al., Distributed audit with secure remote procedure calls, Security Technology, 1991, Proceedings, 25th Annual 1991, IEEE International Carnahan Conference on, Oct. 1–3, 1991, pp. 154–160.*

Gray & Reuter, The Role of a Compensating Transaction, *Transaction Processing: Concepts and Techniques*, pp. 204–205 (1993).

Tucker, Jr. (Editor), Concurrency Control and Recovery, *The Computer Science and Engineering Handbook*, pp. 1058–1077 (Dec. 1996).

Bernstein and Newcomer, "Database System Recovery," Principles of Transaction Processing for the Systems Professional, Morgan Kaufmann Publishers, Inc., San Francisco, CA, chapter 8, pp. 241–266 (Jan. 1997).

Gray & Reuter, "Long Manager," Transaction Processing: Concepts and Techniques, Morgan Kaufmann Publishers, San Francisco, CA, chapter 9, pp. 493–525 (1993).

D. Bruce, "The Treatment of State in Optimistic Systems", IEEE, pp. 40–49 (Jun. 1995).

Orfali, Harkey, Edwards, *"Essential Client/Server Survival Guide,"* pp. 241–288 (1994).

Franklin, *"Concurrency Control and Recovery,"* The Computer Science and Engineering Handbook, pp. 1058–1077 (1997).

Barkley, "Role Based Access Control (RBAC)," Software Diagnostics and Conformance Testing National Institute of Standards and Technology (Mar. 1998).

Gavrila and Barkley, "Formal Specification for Role Based Access Control User/Role and Role/Role Relationship Management," (Oct. 1998).

Barkley, "Application Engineering in Health Care," pp. 1–7 (May 9, 1995).

Cugini and Ferraiolo, "Role Based Access Control Slide Set—May 1995," National Institute of Standards and Technology (1995).

Smith, Sr. et al., "A Marketing Survey of Civil Federal Government Organizations to Determine the Need for a Role–Based Access Control (RBAC) Security Product," Seta Corporation (Jul. 1996).

Ferraiolo and Barkley, "Specifying and Managing Role–Based Access Control within a Corporate Intranet," (1997).

Ferraiolo et al., "Role–Based Access Control (RBAC): Features and Motivations," (1995).

Kuhn, "Mutual Exclusion of Roles as a Means of Implementing Separation of Duty in Role–Based Access Control Systems," (1997).

Barkley, "Comparing Simple Role Based Access Control Models and Access Control Lists," (1997).

Barkley et al., "Role Based Access Control for the World Wide Web," (1997).

Ferraiolo and Kuhn, "Role–Based Access Control," Reprinted from Proceedings of $15^{th}$ National Computer Security Conference (1992).

Barkley, "Implementing Role Based Access Control Using Object Technology," (1995).

Tucker (editor), "The Computer Science and Engineering Handbook," chapter 49, pp. 1112–1124 and chapter 91, pp. 1929–1948 (1996).

Orfali, Harkey, Edwards, "Client/Server Transaction Processing," *Client/Server Survival Guide*, pp. 241–288 (1994).

Franklin, "Concurrency Control and Recovery," *The Computer Science and Engineering Handbook*, pp. 1058–1077 (1997).

Adams et al., "Pointer and Run–time Allocation," C++ *An Introduction to Computing*, chapter 15, pp. 860–869 (1995).

Brockschmidt, "Inside OLE" (second edition), chapter 5, pp. 219–276 and chapter 22, pp. 1011–1063 (1995).

"Java Remote Method Invocation Specification," *Java Development Kit (JDK)*, vol. 1, Sun Microsystems, Inc., (1996,1997).

J. Steinman. "Incremental State Saving in Speedes Using C++," IEEE, pp. 687–696.

R. Limprecht, "Microsoft Transaction Server," IEEE Compcon '97, pp. 14–18.

* cited by examiner

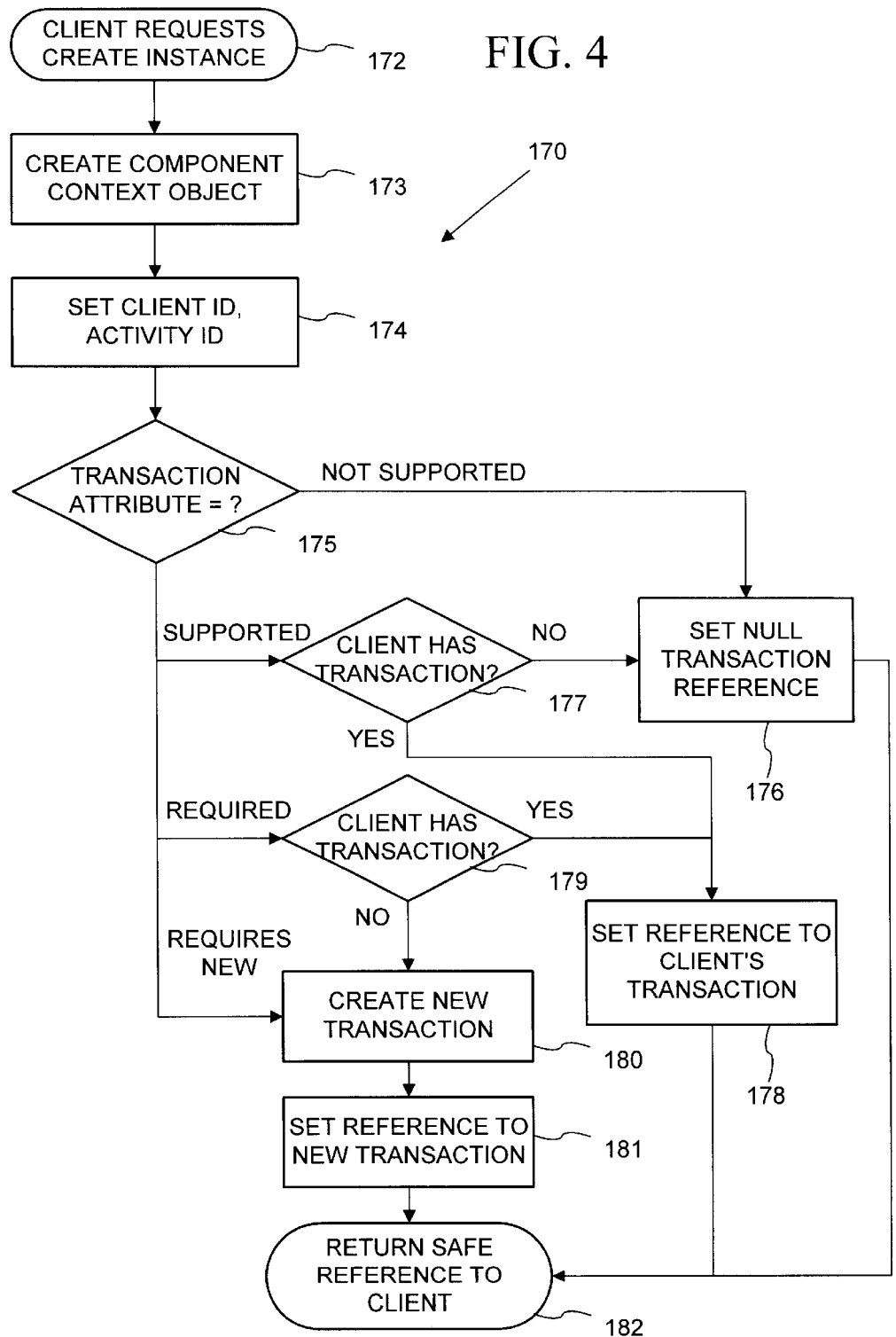

TRANSACTION PROCESSING OF DISTRIBUTED OBJECTS WITH DECLARATIVE TRANSACTIONAL ATTRIBUTES

RELATED APPLICATION DATA

This application is a continuation of U.S. patent application Ser. No. 08/959,141, entitled AUTOMATIC TRANSACTION PROCESSING OF COMPONENT-BASED SERVER APPLICATIONS, filed on Oct. 28, 1997 now U.S. Pat. No. 5,890,161.

FIELD OF THE INVENTION

The present invention relates to a server application-programming model using software components, and more particularly relates to transaction processing with the server application components.

BACKGROUND AND SUMMARY OF THE INVENTION

In many information processing applications, a server application running on a host or server computer in a distributed network provides processing services or functions for client applications running on terminal or workstation computers of the network which are operated by a multitude of users. Common examples of such server applications include software for processing class registrations at a university, travel reservations, money transfers and other services at a bank, and sales at a business. In these examples, the processing services provided by the server application may update databases of class schedules, hotel reservations, account balances, order shipments, payments, or inventory for actions initiated by the individual users at their respective stations.

Often, server applications require coordinating activities on multiple computers, by separate processes on one computer, and even within a single process. For example, a money transfer operation in a banking application may involve updates to account information held in separate databases that reside on separate computers that may be geographically remote. Desirably, groups of activities that form parts of an operation are coordinated so as to take effect as a single indivisible unit of work, commonly referred to as a transaction. In many applications, performing sets of activities as a transaction becomes a business necessity. For example, if only one account is updated in a money transfer operation due to a system failure, the bank in effect creates or loses money for a customer.

A transaction is a collection of actions that conform to a set of properties (referred to as the "ACID" properties) which include atomicity, consistency, isolation, and durability. Atomicity means that all activities in a transaction either take effect together as a unit, or all fail. Consistency means that after a transaction executes, the system is left in a stable or correct state (i.e., if giving effect to the activities in a transaction would not result in a correct stable state, the system is returned to its initial pre-transaction state). Isolation means the transaction is not affected by any other concurrently executing transactions (accesses by transactions to shared resources are serialized, and changes to shared resources are not visible outside the transaction until the transaction completes). Durability means that the effects of a transaction are permanent and survive system failures. For additional background information on transaction processing, see, inter alia, Jim Gray and Andreas Reuter, *Transaction Processing Concepts and Techniques*, Morgan Kaufmann, 1993.

In many current systems, services or extensions of an operating system referred to as a transaction manager or transaction processing (TP) monitor implement transactions. A transaction is initiated by a client program, such as in a call to a "begin_transaction" application programming interface (API) of the transaction monitor. Thereafter, the client initiates activities of a server application or applications, which are performed under control of the TP monitor. The client ends the transaction by calling either a "commit_transaction" or "abort_transaction" API of the TP monitor. On receiving the "commit_transaction" API call, the TP monitor commits the work accomplished by the various server application activities in the transaction, such as by effecting updates to databases and other shared resources. Otherwise, a call to the "abort_transaction" API causes the TP monitor to "roll back" all work in the transaction, returning the system to its pre-transaction state.

In systems where transactions involve activities of server applications on multiple computers, a two-phase commit protocol often is used. In general, the two-phase commit protocol centralizes the decision to commit, but gives a right of veto to each participant in the transaction. In a typical implementation, a commit manager node (also known as a root node or transaction coordinator) has centralized control of the decision to commit, which may for example be the TP monitor on the client's computer. Other participants in the transaction, such as TP monitors on computers where a server application performs part of the work in a transaction, are referred to as subordinate nodes. In a first phase of commit, the commit manager node sends "prepare_to_commit" commands to all subordinate nodes. In response, the subordinate nodes perform their portion of the work in a transaction and return "ready_to_commit" messages to the commit manager node. When all subordinate nodes return ready_to_commit messages to the commit manager node, the commit manager node starts the second phase of commit. In this second phase, the commit manager node logs or records the decision to commit in durable storage, and then orders all the subordinate nodes to commit their work making the results of their work durable. On committing their individual portions of the work, the subordinate nodes send confirmation messages to the commit manager node. When all subordinate nodes confirm committing their work, the commit manager node reports to the client that the transaction was completed successfully. On the other hand, if any subordinate node returns a refusal to commit during the first phase, the commit manager node orders all other subordinate nodes to roll back their work, aborting the transaction. Also, if any subordinate node fails in the second phase, the uncommitted work is maintained in durable storage and finally committed during failure recovery.

In the prior transaction processing systems discussed above, transactions are initiated and completed by explicit programming in the client program, such as by calls to the begin_transaction, commit_transaction and abort_transaction APIs of the transaction monitor. This adds to complexity and increases the burden of programming the server application and client program. Specifically, the client program must be programmed to properly initiate and complete a transaction whenever it uses a server application to perform work that requires a transaction (e.g., work which involves multiple database updates that must be completed together as an atomic unit of work). The server application, on the other hand, relies on its clients to properly manage transactions, and cannot guarantee that all client programs properly initiate and complete transactions when using the server application. The server application therefore must be programmed to handle the special case where the client fails to initiate a needed transaction when using the server application.

The requirement of a client program to explicitly initiate and complete transactions can pose further difficulties in programming models in which the server application is implemented as separate software components, such as in object-oriented programming ("OOP"). In object-oriented programming, programs are written as a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

Object-oriented programming generally has advantages in ease of programming, extensibility, reuse of code, and integration of software from different vendors and (in some object-oriented programming models) across programming languages. However, object-oriented programming models can increase the complexity and thus programming difficulty of the server application where transaction processing requires explicit initiation and completion by client programs. In particular, by encouraging integration of software components from different vendors, an object-oriented programming model makes it more difficult for programmers to ensure that the client program properly initiates and completes transactions involving the server application's work. Components that are integrated to form the server application and client programs may be supplied by programmers and vendors who do not directly collaborate, such that it is no longer possible to enforce proper behavior of other components by knocking on a colleague's door down the hall. In the absence of direct collaboration, the programmers often must carefully program the components to handle cases where transactions are not properly initiated and completed by the components' clients.

The present invention frees component-based server applications from reliance on explicit programming of their clients to properly manage transaction processing by automatically providing a transaction to encompass a server application component's work according to a server application component's transactional expectations. This simplifies programming of server applications, since the server application components need not be programmed to handle special cases where a client program that uses the component fails to initiate a transaction. The task of programming client also is simplified since the client program need not explicitly initiate and complete transactions even for server application components that require transactions.

According to one aspect of the invention, server application components are run in an execution environment under control of a system-provided service. In this execution environment, a transactional attribute is associated with the server application component to indicate its transactional expectations. For example, the transactional attribute of a server application component that performs multiple database updates can be set to indicate a transaction is required. Then, if a client program fails to provide a transaction when using the component, the system service automatically initiates a transaction to encompass the component's work. The system service also automatically ends the transaction after the work in the transaction is complete.

Additional features and advantages of the invention will be made apparent from the following detailed description of an illustrated embodiment which proceeds with reference to the accompanying drawings.

BRIEF DESCRIPTION OF THE DRAWINGS

FIG. 4 is a flow chart of a method performed by the server executive in the execution environment of FIG. 2 to automatically control transaction processing of server application components' work.

DETAILED DESCRIPTION OF THE ILLUSTRATED EMBODIMENTS

The present invention is directed toward a method and system for automatic transactions with object-oriented component-based server applications. In one embodiment illustrated herein, the invention is incorporated into an application server execution environment or platform, entitled "Microsoft Transaction Server," marketed by Microsoft Corporation of Redmond, Wash. Briefly described, this software provides a run-time environment and services to support component-based server applications in a distributed network.

Exemplary Operating Environment

Figure 1:
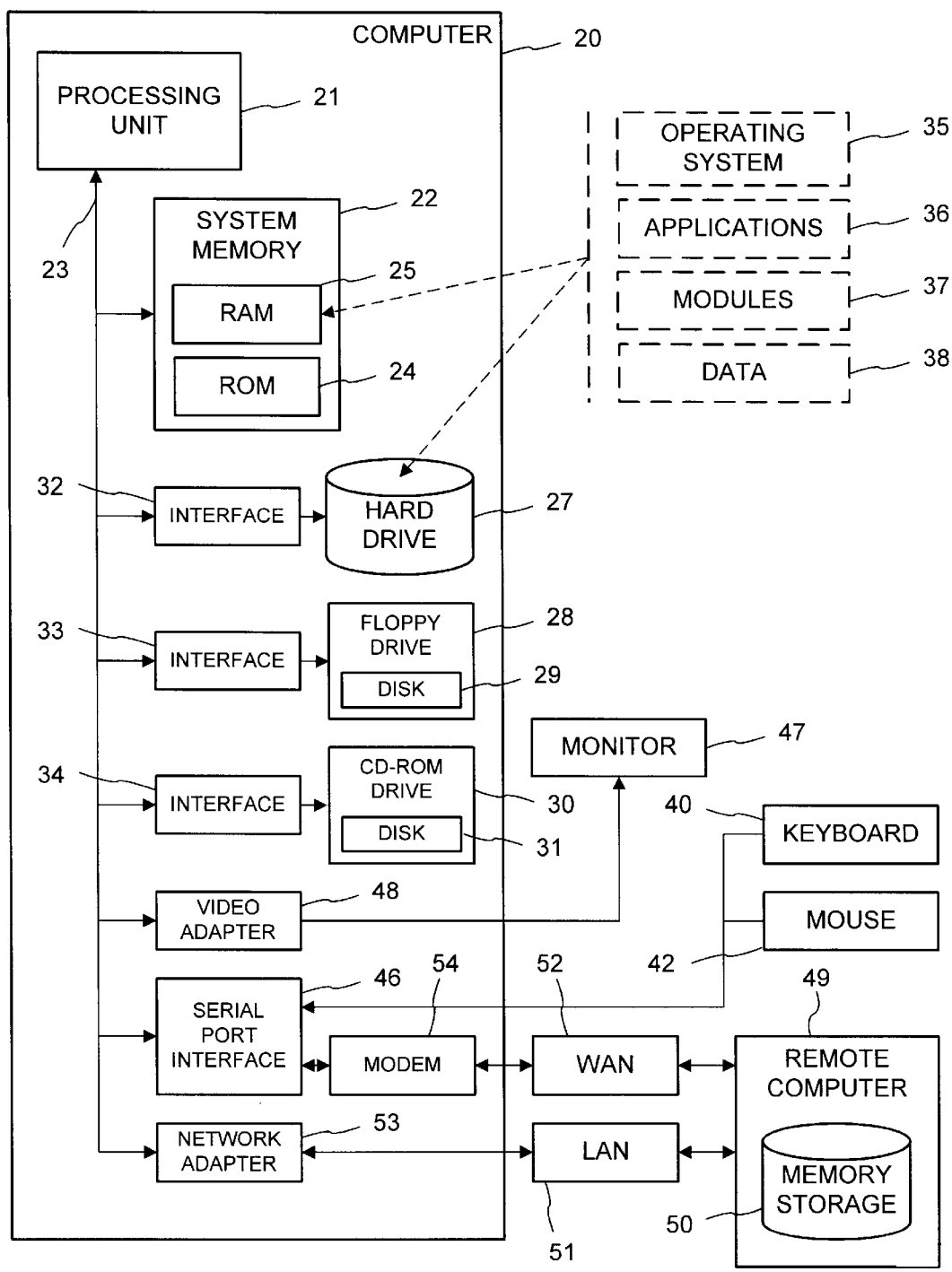
FIG. 1 is a block diagram of a distributed computer system that may be used to implement a method and apparatus embodying the invention for automatic transactions with component-based server applications.

FIG. 1 and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional server computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the server computer 20, such as during start-up, is stored in ROM 24.

The server computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the server computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. The operating system 35 in the illustrated server computer is the Microsoft Windows NT Server operating system, together with the before mentioned Microsoft Transaction Server.

A user may enter commands and information into the server computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, server computers typically include other peripheral output devices (not shown), such as speakers and printers.

The server computer 20 may operate in a networked environment using logical connections to one or more remote computers, such as a remote client computer 49. The remote computer 49 may be a workstation, a server computer, a router, a peer device or other common network node, and typically includes many or all of the elements described relative to the server computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the server computer 20 is connected to the local network 51 through a network interface or adapter 53. When used in a WAN networking environment, the server computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the server computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the server computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Server Application Execution Environment

Figure 2:
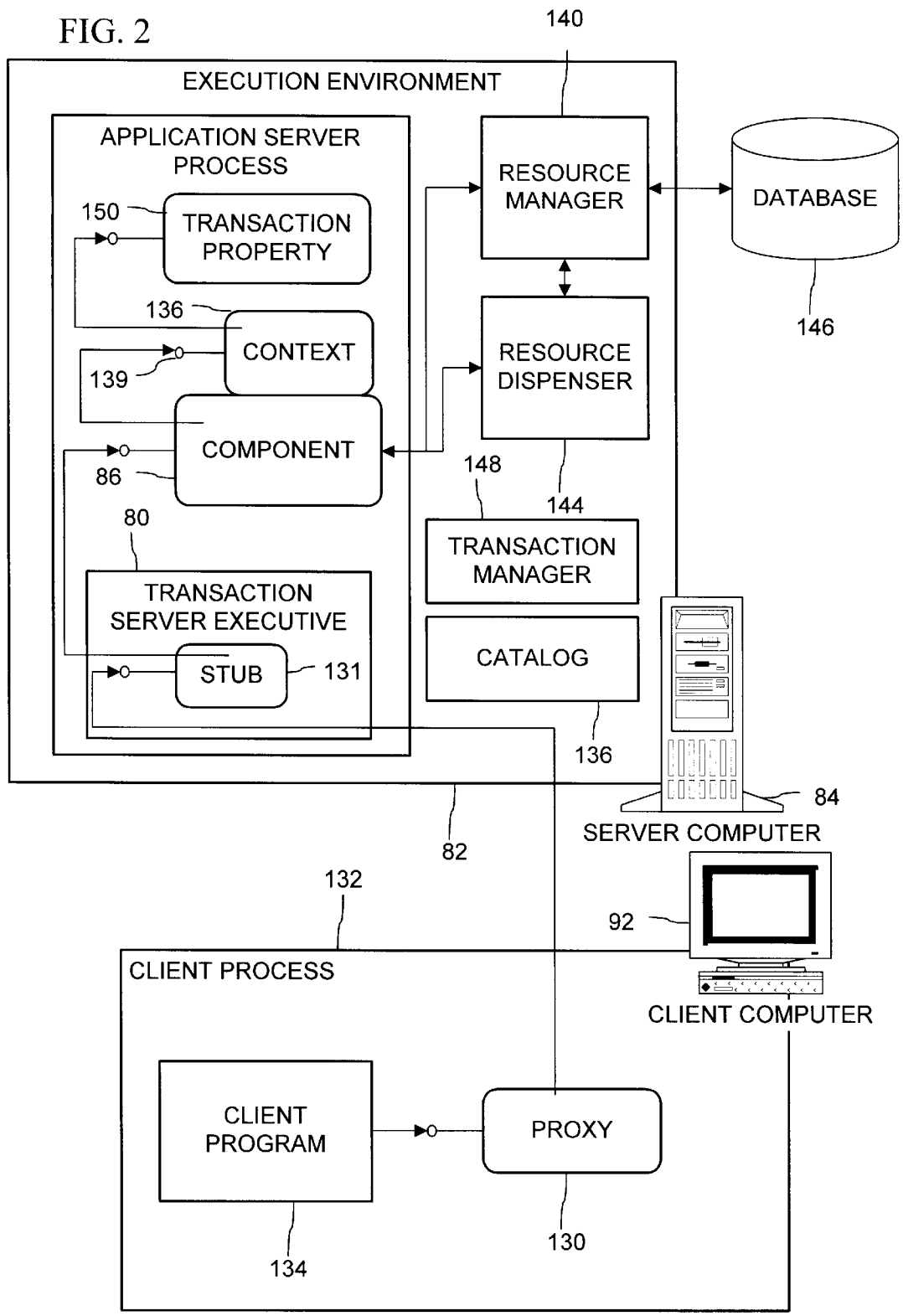
FIG. 2 is a block diagram of a server application component execution environment provided by a server executive on a server computer in the distributed computer system of FIG. 1.

With reference now to FIG. 2, a transaction server executive 80 provides run-time or system services to create a run-time execution environment 80 on a server computer 84 that automatically provides transactions to encompass work of a server application component (e.g., server application component 86) according to its transactional expectations. The transaction server executive also provides services for thread and context management to the server application components 86. Included in the services are a set of API functions, including a GetObjectContext and a SafeRef API functions described below. Additionally, the transaction server executive 80 provides system-defined objects (including a component context object 136) that support component integration interfaces.

The illustrated transaction server executive 80 is implemented as a dynamic link library ("DLL"). (A DLL is a well-known executable file format which allows dynamic or run-time linking of executable code into an application program's process.) The transaction server executive 80 is loaded directly into application server processes (e.g., "ASP" 90) that host server application components, and runs transparently in the background of these processes.

The illustrated ASP 90 is a system process that hosts execution of server application components. Each ASP 90 can host multiple server application components that are grouped into a collection called a "package." Also, multiple ASPs 90 can execute on the server computer under a multi-threaded, multi-tasking operating system (e.g., Microsoft Windows NT in the illustrated embodiment). Each ASP 90 provides a separate trust boundary and fault isolation domain for the server application components. In other words, when run in separate ASPs, a fault by one server application component which causes its ASP to terminate generally does not affect the server application components in another ASP. In the illustrated embodiment, server application components are grouped as a package to be run together in one ASP 90 using an administration utility called "the Transaction Server Explorer." This utility provides a graphical user interface for managing attributes associated with server application components, including grouping the components into packages.

In a typical installation shown in FIG. 2, the execution environment 80 is on the server computer 84 (which may be an example of the computer 20 described above) that is connected in a distributed computer network comprising a large number of client computers 92 which access the server application components in the execution environment. Alternatively, the execution environment 80 may reside on a single computer and host server application components accessed by client processes also resident on that computer.

Server Application Components

The server application components 86 that are hosted in the execution environment 80 of the ASP 90 implement the business logic of a server application, such as the code to manage class registrations in a university's registration application or orders in an on-line sales application. Typically, each server application comprises multiple components, each of which contains program code for a portion of the application's work. For example, a banking application may comprise a transfer component, a debit account component, and a credit account component which perform parts of the work of a money transfer operation in the application. The debit account component in this banking application example implements program code to debit a specified account in a banking database by a specified amount. The credit account component implements program code to credit a specified account in the database by a specified amount. The transfer component implements program code that uses the debit account component and credit account component to effect a money transfer between two accounts.

Figure 3:
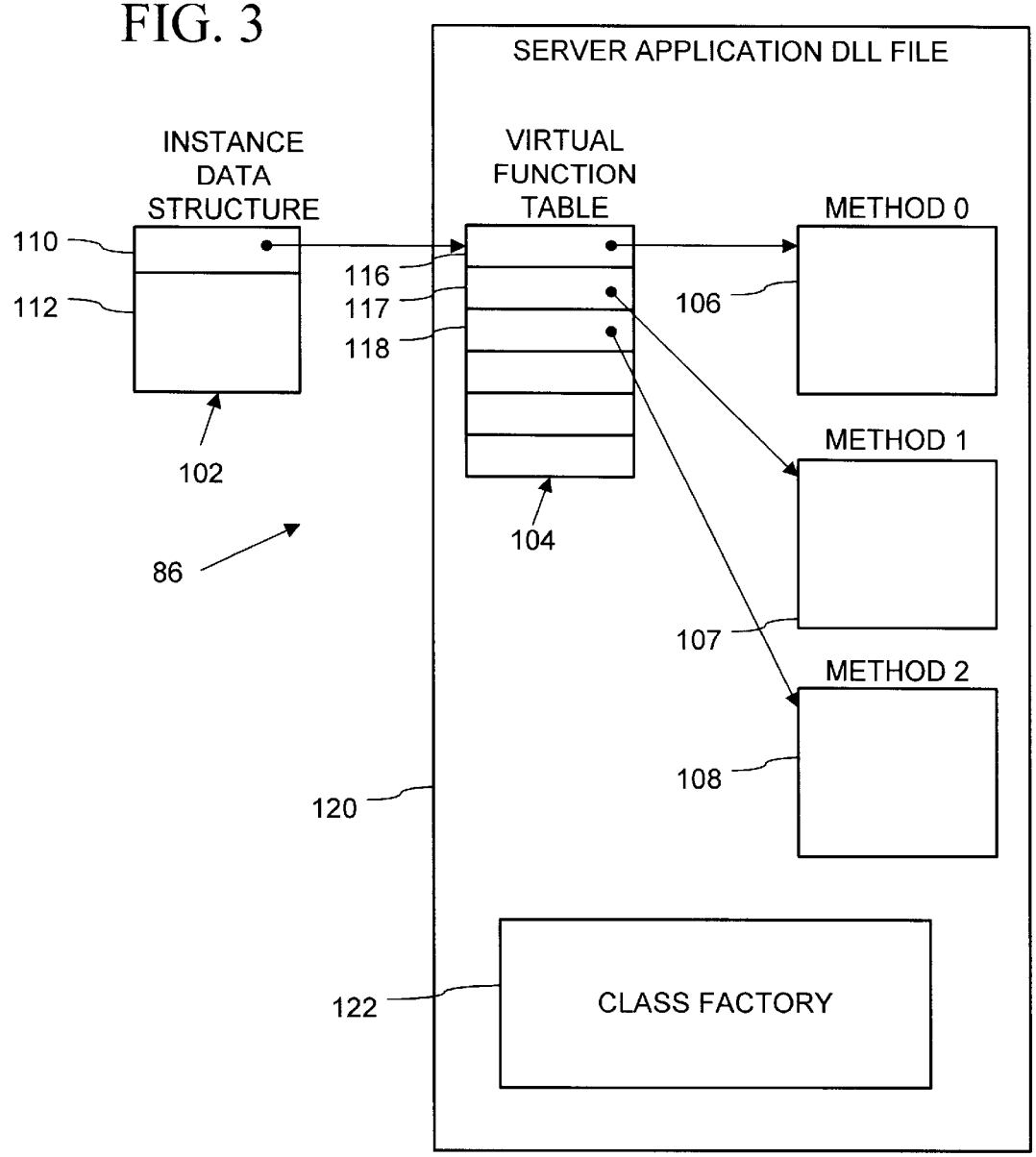
FIG. 3 is a block diagram of the structure of a server application component in the execution environment of FIG. 2.

With reference now to FIG. 3, the server application component 86 (FIG. 2) in the illustrated embodiment conforms to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

In accordance with COM, the server application component 86 is represented in the computer system 20 (FIG. 1) by an instance data structure 102, a virtual function table 104, and member functions 106–108. The instance data structure 102 contains a pointer 110 to the virtual function table 104 and data 112 (also referred to as data members, or properties of the component). A pointer is a data value that holds the address of an item in memory. The virtual function table 104 contains entries 116–118 for the member functions 106–108. Each of the entries 116–118 contains a reference to the code 106–108 that implements the corresponding member function.

The pointer 110, the virtual function table 104, and the member functions 106–108 implement an interface of the server application component 86. By convention, the interfaces of a COM object are illustrated graphically as a plug-in jack as shown for the server application component 100 in FIG. 3. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName."

The virtual function table 104 and member functions 106–108 of the server application component 86 are provided by a server application program 120 (hereafter "server application DLL") which is stored in the server computer 84 (FIG. 2) as a dynamic link library file (denoted with a ".dll" file name extension). In accordance with COM, the server application DLL 120 includes code for the virtual function table 104 (FIG. 3) and member functions 106–108 (FIG. 3) of the classes that it supports, and also includes a class factory 122 that generates the instance data structure 102 (FIG. 3) for a component of the class.

Like any COM object, the sever application component can maintain internal state (i.e., its instance data structure 102 including data members 112) across multiple interactions with a client (i.e., multiple client program calls to member functions of the component). The server application component that has this behavior is said to be "stateful." The server application component can also be "stateless," which means the component does not hold any intermediate state while waiting for the next call from a client.

In the execution environment 80 of FIG. 2, the server application component 86 is executed under control of the transaction server executive 80 in the ASP 90. The transaction server executive 80 is responsible for loading the server application DLL 300 into the ASP 90 and instantiating the server application component 86 using the class factory 122. The transaction server executive 80 further manages calls to the server application component 86 from client programs (whether resident on the same computer or over a network connection).

The illustrated execution environment 80 imposes certain additional requirements on the server application component 86 beyond conforming with COM requirements. First, the server application component is implemented in a DLL file (i.e., the server application DLL 120 of FIG. 3). (COM objects otherwise alternatively can be implemented in an executable (".exe") file.) Second, the component's DLL file 120 has a standard class factory 122 (i.e., the DLL implements and exports the DllGetClassObject function, and supports the IClassFactory interface). Third, the server. application component exports only interfaces that can be standard marshaled, meaning the component's interfaces are either described by a type library or have a proxy-stub DLL. The proxy-stub DLL provides a proxy component 130 in a client process 132 on the client computer 92, and a stub component 131 in the ASP 90 on the server computer 84. The proxy component 130 and stub component 131 marshal calls from a client program 134 across to the server computer 84. The proxy-stub DLL in the illustrated system is built using the MIDL version 3.00.44 provided with the Microsoft Win32 SDK for Microsoft Windows NT 4.0 with the Oicf compiler switch, and linked with the transaction server executive 80. These additional requirements conform to well known practices.

The client program 134 of the server application component 86 is a program that uses the server application component. The client program can be program code (e.g., an application program, COM Object, etc.) that runs outside the execution environment 80 (out of the control of the transaction server executive 80). Such client programs are referred to as "base clients." Alternatively, the client program 134 can be another server application component that also runs under control of the transaction server executive (either in the same or a separate ASP 90). The client program 134 can reside on the server computer 84 or on a separate client computer 92 as shown in FIG. 2 (in which case the client computer interacts with the server application component 86 remotely through the proxy object 130 and stub object 131).

Before the server application component 86 can execute in the illustrated execution environment 80, the server application component 86 is first installed on the server computer 84. As with any COM object, the server application component 86 is installed by storing the server application DLL file 120 that provides the server application component 86 in data storage accessible by the server computer (typically the hard drive 27, shown in FIG. 1, of the server computer), and registering COM attributes (e.g., class identifier, path and name of the server application DLL file 120, etc. as described below) of the server application component in the system registry. The system registry is a configuration database. In addition to the server application component's COM attributes, the server application is registered in the system registry with a "transaction server execution" attribute indicating that the server application component is run under control of the transaction server executive in the illustrated execution environment 80. In the illustrated embodiment, this attribute has the form shown in the following example registry entry.
HKEY_CLASSES_ROOT\CLSID\{AB077646-E902-11D0-B5BE-00C04FB957D8}\LocalServer32= C:\WINNT\System32\mtx.exe/p:{DA16F24B-2E23-11D1-8116-00C04FC2F9C1}

When the server application component 86 is run in the execution environment 80, the transaction server executive 80 maintains a component context object 138 associated with the server application component 86. The component context object 138 provides context for the execution of the server application component 86 in the execution environment 80. The component context object 138 has a lifetime that is coextensive with that of the server application component. The transaction server executive 80 creates the component context object 138 when the server application component 86 is initially created, and destroys the component context object 138 after the application server component 86 is destroyed (i.e., after the last reference to the application server component is released).

The component context object 138 contains intrinsic properties of the server application component that are determined at the component's creation. These properties include a client id, an activity id, and a transaction reference. The client id refers to the client program 134 that initiated creation of the server application component. The activity id refers to an activity that includes the server application component. An activity is a set of components executing on behalf of a base client, within which only a single logical thread of execution is allowed. The transaction reference indicates a transaction property object 150 that represents a transaction in which the server application component participates. The component context object 138 is implemented as a COM Object that runs under control of the transaction server executive. The component context object 138 provides an "IObjectContext" interface described in more detail below, that has member functions called by the server application component 86.

In the illustrated execution environment, the transaction server executive 80 maintains an implicit association of the component context object 138 to the server application component 86. In other words, the transaction server executive 80 does not pass a reference of the component context object 138 to the client program 134 which uses the server application component 86. Rather, the transaction server executive 80 maintains the component's association with the context object, and accesses the component context object when needed during the client program's access to the server application component 86. Thus, the client program 134 is freed from explicitly referencing the component context object 138 while creating and using the server application component 86.

With reference again to FIG. 2, the server computer 84 also runs a resource manager 140 and a resource dispenser 144. The resource manager 140 is a system service that manages durable data (e.g., data in a database 146). The server application component 86 can use the resource manager to maintain the durable state of the server application (such as, the record of inventory on hand, pending orders, and accounts receivable in an on-line sales server application). Examples of resource managers in the illustrated embodiment include the Microsoft SQL Server, durable message queues, and transactional file systems. Preferably, the resource manager 140 supports performing changes or updates by the server application component 86 to the server application's durable state on a transactional basis (i.e., in transactions conforming to the well-known ACID properties).

The resource dispenser 144 is a service that manages non-durable shared state (i.e., without the guarantee of durability) on behalf of the server application components within the ASP 90. Examples of the resource dispenser 144 in the illustrated embodiment include an ODBC resource dispenser that maintains a pool of database connections conforming to the Microsoft Open Database Connectivity ("ODBC") call level interface. The ODBC resource dispenser allocates database connections to the server application component for accessing data from a database 146 (generally, through its resource manager 140). Also, the ODBC resource dispenser reclaims database connections when released by the server application components for later reuse.

The illustrated execution environment 82 further includes a transaction manager 148. The transaction manger 148 is a system service that coordinates transactions that span multiple resource managers, including where the resource managers reside on more than one server computer in a distributed network. The transaction manager 148 ensures that updates across all resources managers involved in a transaction occur in conformance with the ACID properties using the well known two-phase commit protocol, regardless of failures (e.g., computer or network hardware or software failures, or errors caused by a misbehaved resource manager or application), race conditions (e.g., a transaction that starts to commit while one resource manager initiates an abort), or availability (a resource manager prepares a transaction but never returns). The illustrated transaction manager 148 is the Microsoft Distributed Transaction Coordinator (MSDTC) released as part of Microsoft SQL Server 6.5.

Transaction Processing with Server Application Components

The illustrated execution environment 80 also provides support for transaction processing conforming to the ACID properties and using the well known two phase commit protocol. In addition, the illustrated execution environment 80 supports automatically providing transactions for server application components according to the components' transactional expectations without client control.

Transaction Initiation

In the illustrated execution environment 80, one or more server application components that participate in a transaction (i.e., an atomic unit of work that is either done in its entirety or not at all) will each have a transaction property object 150 associated with their component context object 136 to represent the transaction. The transaction server executive 80 creates the transaction property object 150 when the transaction is initiated, and associates the transaction property object with the component context object of each server application component in the transaction.

While the server application component 86 is associated with the transaction property object 150, the transaction server executive automatically associates the transaction property object 150 with any other server application object that is created by the server application component 86 or resource that is obtained by the server application component 86. For example, a money transfer operation in an on-line banking server application can be implemented in a "transfer" server application component that creates two "account" server application components to debit and credit the transferred amount to the affected accounts. Thus, when the transfer component creates the account components, the transaction server executive automatically associates the account components with the transfer component's transaction property object so that work of the individual account component in the money transfer is performed as a single atomic action. Also, any resources obtained by the server application component 86 from the resource manager 140 or resource dispenser 144 are associated with the component's transaction property object 150 so that services performed by the resource manager or dispenser on the component's behalf also are encompassed within the transaction. For example, when the server application component 86 allocates a database connection using the ODBC Resource Dispenser while associated in a transaction, the connection is automatically enlisted on the transaction. All database updates using the connection become part of the transaction, and are either atomically committed or aborted.

Transaction Attribute

In addition to registering COM attributes and the transaction server execution attribute in the system registry, the server application component 86 also is registered in a transaction server catalog 136. The transaction server catalog 136 is a configuration database that stores the attributes of the server application component 86 related to execution of the component in the illustrated execution environment 80. In an alternative embodiment, these attributes can be stored as "meta data" in the component itself (i.e., in the DLL that implements the component) so that the component is self-describing. These attributes include a transaction attribute that represents the server application component's transactional expectations, and controls participation of the server application component in transaction processing under the illustrated execution environment 80. In the illustrated embodiment, the server application component's attributes can be modified by a system administrator or like user using the transaction server explorer utility which provides a component property sheet (a graphical user interface dialog) with user interface controls for setting the attributes.

The component's transaction attribute can be declared as one of the values, "not supported," "supported," "required," or "requires new." The not supported value of the transaction attribute indicates the component should not be run in the scope of a transaction. This value is a default setting, and is primarily intended for use with COM objects that are not specifically designed to execute in the illustrated execution environment (such as those that predate the invention).

The supported value indicates the component can execute in the scope of their client's transaction. The supported value typically is assigned to a server application component when the work of the component alone need not be in a transaction, such as where the component itself performs only a single database update. But, the component's work also can form part of a transaction, such as where the component's database update is made in combination with those of other components. In the above mentioned example of a banking application that provides a debit account component, a credit account component and transfer component, the debit account component and credit account component are examples of components that each implement only a single database update (i.e., a credit or debit to an account balance in a database record). The debit and credit account components can be used in operations where a transaction is not required, such as a deposit or withdrawal operation involving only the component's single database update. As mentioned above, the transfer component also uses the debit and credit account components in a money transfer operation between two accounts which involves multiple database updates (i.e., the debit by the debit account component and credit by the credit account component). In such case, the debit and credit account components should both execute within the transfer component's transaction so that the updates occur as an atomic unit of work. The debit and credit account components thus have the transactional expectation that they execute in the scope of their client's transaction, if any, which is represented by assigning the "supported value" to their transaction attribute.

The required value, on the other hand, indicates the component must execute within the scope of a transaction (either their client's transaction or a new transaction if their client has no transaction). The required value typically is assigned to components that perform multiple database updates, and require a transaction to ensure the updates are effected atomically. In the above mentioned banking application example, the transfer component implements a money transfer operation involving multiple database updates (i.e., the debit and credit performed by the debit and credit account components) which must be effected atomically. The transfer component thus has the transactional expectation that its work must be in a transaction, which is represented by assigning the required value as its transaction attribute.

In the illustrated execution environment 82, both the supported and required values allow the server application component to be run in the client's transaction. In other words, if the client program 134 that requested creation of the server application component has a transaction, the server application component is run in the client's transaction. The difference between the values occurs when the component's client has no transaction. When the transaction attribute is supported and the component's client has no transaction, the server application component also executes without a transaction. When the transaction attribute is required and the component's client has no transaction, the transaction server executive initiates and executes the component in a new transaction.

The requires new value of the transaction attribute indicates the component must execute in a new transaction even if the component's client has a transaction. This causes the transaction server executive 80 to always create an independent transaction for the component. The requires new transaction attribute value can be used, for example, with an auditing component that records work done on behalf of another transaction regardless of whether the original transaction commits or aborts.

Automatic Transactions

With reference to FIG. 4, the transaction server executive 80 automatically provides a transaction for the server application component 86 in a method 170 according to the component's transactional expectations (i.e., transaction attribute) without client control. As indicated at step 172, the method 170 commences when the client program 134 initially requests creation of an instance of the server application component. (There are various ways for the client program 134 to make this request as discussed more fully in a following section, entitled "Creating The Server Application Component." However, the transaction server executive 80 follows the method 170 in each case.)

Upon receiving the client program's request to instantiate the server application component, the transaction server executive 80 creates the component context object 138 for the server application component 86 at a step 173. At a step 174, the transaction server executive 80 sets the client id and activity id data properties of the component context object 138 to indicate the client program 134 and activity associated with the client program, respectively. The transaction server executive 80 next sets the component context object's transaction data property in steps 175–181.

At step 175, the transaction server executive 80 checks the transaction attribute registered for the server application component 138 in the catalog 136. As discussed above, the transaction attribute represents the transactional expectations of the server application component 86. If the transaction attribute is set to not supported, the transaction server executive 80 sets the transaction data property of the component context object 138 to a null transaction reference at step 176, which means the server application component is not part of a transaction.

However, if the transaction attribute check at step 175 shows that the transaction attribute is registered as supported, the transaction server executive 80 further checks at step 177 whether the client program 134 has a transaction. If so, the transaction server executive 80 at step 178 sets the transaction data property of the component context object 134 to reference the client program's transaction (more specifically, to reference the transaction context object that represents the client program's transaction). As discussed above, this results in the server application component running under control of the transaction, such that the server application component's work (i.e., database updates) is committed or aborted with the transaction. However, if the check at step 177 indicates the client program 134 does not have a transaction, the transaction server executive 80 sets the transaction data property of the component context object 138 to a null transaction reference at step 176, which results in the server application component running outside the scope of a transaction and the component's work succeeds or fails on an individual basis.

On the other hand, if the transaction attribute check at step 175 shows the transaction attribute is registered as required, the transaction server executive 80 at a step 179 further checks whether the client has a transaction. This time, if the client has a transaction, the transaction server executive 80 also proceeds to set the component context object's transaction data property to reference the client program's transaction at step 178. However, if the client program 134 does not have a transaction, the transaction server executive 80 instead creates a new transaction context object to represent a new transaction at a step 180 and sets the transaction data property to reference the new transaction at a step 181.

Otherwise, when the transaction attribute check at step 175 shows the server application component's transaction attribute is registered as requires new, the transaction server executive 80 directly proceeds to create the new transaction and set the transaction data property to reference the new transaction in steps 180–181.

The transaction server executive 80 finally returns a safe reference to the client program at a step 182 with which the client program can invoke member functions of the server application component 86 as discussed below in the section entitled "Safe References".

Thus, according to the method 170, the transaction server executive 80 automatically provides a transaction encompassing the server application component's work when the component's transaction attribute indicates a transaction is required and the client program has not initiated a transaction (as shown in steps 175, 179–181). Also, the transaction server executive 80 automatically provides a transaction independent of the client program where the component's transaction attribute (i.e., "requires new") indicates a separate transaction is expected (as shown in steps 175, 180–181). However, where the component's transactional expectations allow the component to execute in a transaction under control of the client program (e.g., the "supported" and "required" transaction attribute) and the client program has initiated a transaction, the transaction server executive 80 runs the server application component in the client-controlled transaction.

Controlling Transaction Outcome

In the illustrated execution environment 82 (FIG. 2), the transaction manager 148 decides the outcome of a transaction based on success or failure of the work done by the transaction's participants, and completes the transaction accordingly (either aborting or committing) so as to conform to the ACID principles. Participants in the transaction can affect the transaction outcome in various ways.

Client Control of Transaction Outcome

A base client (i.e., where the client program 134 of the server application component 86 executes outside the execution environment 82 as illustrated in FIG. 2) can control transaction outcome in the illustrated execution environment using a transaction context object (not shown). The transaction context object provides an ITransactionContext interface (described below) through which the client program 134 controls the transaction. The client program 134 calls member functions of this interface to create server application components that participate in a transaction (the "CreateInstance" member function), and to commit or abort the transaction (the "Commit" and "Abort" member functions). The transaction context object has its transaction attribute set to required, or alternatively requires new, such that the transaction server executive automatically initiates a transaction for the object when created. The implementation of the commit and abort member functions in the transaction context object call the IObjectContext::SetComplete and IObjectContext::SetAbort functions, respectively, to cause an attempt to commit or abort the transaction as described below under the Completion of Automatic Transactions section.

Server Application Component Control of Transaction Outcome

The server application component 86, on the other hand, can affect the outcome of a transaction using "SetComplete," "SetAbort," "EnableCommit and DisableCommit" member functions (described in more detail below) of its component context object's IObjectContext interface. When the server application component 86 has done its portion of the work in a transaction, the component calls either the SetComplete or SetAbort member functions. By calling the SetComplete member function, the server application component 86 indicates its work in the transaction is done satisfactorily.

On the other hand, the server application component 86 calls the SetAbort member function to indicate that its processing in the transaction is done, but the work could not be completed successfully and must be aborted. For example, a debit account component in a server application which updates an account from which money is transferred in a money transfer transaction may call SetComplete when the update leaves a positive balance in the account, but calls SetAbort when the update would leave a negative account balance. The call to SetAbort in this case also causes other work in the transaction to be "rolled back," such work by a credit account component to add the transfer amount to the transferee account.

Completion of Automatic Transactions

In the illustrated execution environment 82 (FIG. 2), the transaction server executive 80 completes processing of a transaction that was initiated automatically by the transaction server executive to meet the server application component's transactional expectations (herein referred to as an "automatic transaction") when the server application component for which the automatic transaction was initiated completes its work. More specifically, the illustrated execution environment 82 provides an object integration interface (the IObjectContext interface supported on the component context object 138) with which the server application component 86 indicates to the transaction server executive 80 that its work is complete. The server application component 86 calls a SetComplete member function of this interface to indicate its work was successfully completed, and calls a SetAbort member function to indicate its work was completed but must be aborted. When next returning from the server application component after the component has called either of these functions, the transaction server executive 80 causes the transaction manager 148 to complete the transaction. If the SetComplete function was called, the transaction server executive 80 causes the transaction to be committed (as long as no other component or resource involved in the transaction has indicated to abort the transaction). If the SetAbort function was called, the transaction server executive 80 causes the transaction to be aborted.

In the above discussed banking application for example, the transaction server executive 80 initiates an automatic transaction for the transaction component (whose transaction attribute is set to required because it performs two separate database updates using the credit and debit account components) if the transaction component's client program created the transaction component without initiating a transaction. The transaction component, in turn, creates the debit and credit account components to perform the withdrawal and deposit to the affected transferor and transferee accounts which form parts of the money transfer transaction. When created by the transaction server executive 80, the debit and credit account components (whose transaction attribute is set to supported because they perform only a single database update each) each automatically inherit the transaction from the transaction component.

After each component completes its part of the work (which may occur over the course of several interactions or calls from the client program 134 to transaction component, and transaction component to debit and credit account components), the components call either the SetComplete or SetAbort function of their component context objects. Upon the transaction component returning from a client program call during which the transaction component indicated completion of its work using the SetComplete or SetAbort functions, the transaction server executive 80 completes the transaction. If the transaction component called the SetComplete function and no other transaction participant indicated the transaction was to be aborted (such as the credit account component calling the SetAbort function), the transaction server executive 80 causes the transaction manager to commit the transaction. Otherwise, the transaction server executive 80 completes the transaction by causing the transaction manager to abort the transaction.

Overview of COM Object Instantiation in OLE

As with other COM objects, the client program 134 (FIG. 2) must first request creation of an instance of the server application component 86 (FIG. 2) and obtain a reference to the server application component before the client program can access the functionality implemented by the server application component (i.e., before the client program can call member functions supported on an interface of the server application component).

In Microsoft's OLE, a client program instantiates a COM object using services provided by OLE and a set of standard component interfaces defined by COM based on class and interface identifiers assigned to the component's class and interfaces. More specifically, the services are available to client programs as application programming interface (API) functions provided in the COM library, which is part of a component of the Microsoft Windows operating system in a file named "OLE32.DLL." Also in OLE, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUID") that the programmer creates with an OLE service named "CoCreateGUID" (or any of several other APIs and utilities that are used to create universally unique identifiers) and assigns to the respective classes. The interfaces of a component additionally are associated with interface identifiers ("IIDs").

In particular, the COM library provides an API function, "CoCreateInstance," that the client program can call to request creation of a component using its assigned CLSID and an IID of a desired interface. In response, the CoCreateInstance API looks up the registry entry of the requested CLSID in the registry to identify the executable file for the class. The CoCreateInstance API function then loads the class' executable file, and uses the class factory in the executable file to create an instance of the COM object. Finally, the CoCreateInstance API function returns a pointer of the requested interface to the client program. The CoCreateInstance API function can load the executable file either in the client program's process, or into a server process which can be either local or remote (i.e., on the same computer or a remote computer in a distributed computer network) depending on the attributes registered for the COM object in the system registry.

Once the client program has obtained this first interface pointer of the COM object, the client can obtain pointers of other desired interfaces of the component using the interface identifier associated with the desired interface. COM defines several standard interfaces generally supported by COM objects including the IUnknown interface. This interface includes a member function named "QueryInterface." The QueryInterface function can be called with an interface identifier as an argument, and returns a pointer to the interface associated with that interface identifier. The IUnknown interface of each COM object also includes member functions, AddRef and Release, for maintaining a count of client programs holding a reference (such as, an interface pointer) to the COM object. By convention, the IUnknown interface's member functions are included as part of each interface on a COM object. Thus, any interface pointer that the client obtains to an interface of the COM object can be used to call the QueryInterface function.

Creating the Server Application Component

With reference still to FIG. 2, the client program 134 can create the server application component 86 in the illustrated execution environment 80 in any of several ways. First, the client program 134 can create the server application component 86 using the CoCreateInstance API function or an equivalent method based on the CoGetClassObject API function and IClassFactory::CreateInstance function (which are a conventional COM API function and standard COM interface). The CoGetClassObject API function on the server computer 84 returns a reference to a class factory provided in the transaction server executive 80 when the system registry entry for the requested class includes the transaction server execution attribute described above. This allows the transaction server executive to participate in a subsequent call to the IClassFactory::CreateInstance function (such as by the CoCreateInstance API function) since the call is then made to the class factory in the transaction server executive. In response to this call, the implementation of the IClassFactory::CreateInstance function in the transaction server executive's class factory creates the component context object 138 of the server application component 86. The transaction server executive 80 later calls the IClassFactory::CreateInstance function of the class factory 122 in the server application DLL file 120 to create the server application component 86. While this first approach may suffice for many client programs, there are some significant limitations for the client program, including the inability of the client program to control the server application component in a transaction.

While this first approach may suffice for many client programs, there are some significant limitations for the client program, including the inability of the client program to control the server application component in a transaction. Under the first approach, the transaction server executive 80 does not place the created server application component 86 in any transaction initiated or controlled by the client. Even though the client has not initiated a transaction for the server application component, the transaction server executive 80 still may automatically provide a transaction to meet the server application component's transactional expectations. Specifically, if the transaction attribute of the server application component 86 is set to either of the not supported or supported values, the transaction server executive 80 does not place the server application component in a transaction (the transaction data property of the server application component's component context object 138 does not contain a transaction reference). Otherwise, if the server application component's transaction attribute is set to either the required or requires new values, the transaction server executive 80 automatically initiates and places the server application component in a transaction (such as by creating the transaction context object 150 for a new transaction, and including a reference to the new transaction context object 150 in the server application component's component context object 138).

Second, the server application component 86 can be created using the component context object of another component. The component context object provides an IObjectContext::CreateInstance member function which can be called to create other server application components that inherit context from the component context object (i.e., the component context objects created for the new components have the same context properties, including client id, activity id and transaction, as the original component context object). Except, in the special cases that the transaction attribute of the created server application component is "not supported" or "requires new," the transaction property is not inherited. For example, where a "transfer" component and two "account" components implement a money transfer operation in an on-line banking server application, the transfer component may create the two account components for the money transfer operation using its component object context. The account components automatically inherit properties from the transfer component's context and are included in the same transaction as the transfer component.

In this second approach, the server application component accesses its component context object using a service of the transaction server executive, called the GetObjectContext API function (described below).

Safe References

When the server application component 86 is created using any of the three above described approaches, the server application component executes in the illustrated execution environment 80 under control of the transaction server executive 80. More specifically, the client program's call to the CoCreateInstance or IObjectContext::CreateInstance functions to initiate creating the server application component returns a reference to the server application component referred to as a "safe reference." References obtained through a call to the server application component's QueryInterface member function (described above) also are safe references. Thus, through use of the QueryInterface function, the client program 134 can obtain multiple safe references to various interfaces supported on the server application component. Also, the client program 134 can pass safe references to other client programs and server application components to allow such other clients to also use the server application component 86.

Instead of being a direct pointer to the server application component's instance data structure 102 (FIG. 3) as are object references in COM, safe references refer indirectly to the server application component through the transaction server executive 80. Thus, calls made to the server application component's member functions using a safe reference always pass through the transaction server executive 80. This allows the transaction server executive to manage context switches, and allows the server application component to have a lifetime that is independent of the client program's reference to the component. The transaction server executive 80 tracks usage of all safe references to the server application component 86 through activation and deactivation, such that all safe references consistently refer to the current instance of the server application component when activated. When deactivated, a call using any safe reference to the server application component causes the transaction server executive to activate the server application component.

So as to ensure that all calls are made to the server application component using a safe reference (i.e., so that the calls pass through the transaction server executive 80), the server application component 86 preferably is programmed to not pass to a client or other object any direct reference to itself outside of a QueryInterface call. Instead, the server application component can obtain a safe reference to itself to provide to clients using a SafeRef API function (described below) of the transaction server executive 80.

Interfaces and API Functions for Automatic Transactions

With reference again to FIG. 2, the IObjectContext interface 139 is an interface of the system provided component context object 138. The IObjectContext interface 139 is used by the server application component 86 to create additional server application components, and to participate in the determination of transaction outcomes. The illustrated IObjectContext interface 139 has the following form (in the C programming language):

```
DECLARE_INTERFACE_(IObjectContext,
    IUnknown)
{
    //IUnknown functions
    HRESULT QueryInterface(THIS_REFIID riid,
        LPVOID FAR* ppvObj);
    ULONG AddRef(THIS);
    ULONG Release(THIS);
    //IObjectContext functions
    HRESULT CreateInstance(THIS_REFCLSID rclsid,
        REFIID riid, LPVOID FAR* ppvObj);
    HRESULT SetComplete(THIS);
    HRESULT SetAbort(THIS);
    HRESULT EnableCommit(THIS);
    HRESULT DisableCommit(THIS);
    BOOL IsIn Transaction(THIS);
};
```

The Create Instance function is called by the server application component to create a new server application component with a context (i.e., client, activity and transaction) that is derived or inherited from the calling server application component. In its call, the server application component passes the parameters, "rclsid," "riid," and "ppvObj." The "rclsid" is a class identifier that specifies the new server application component to be created. The "riid" parameter is an interface identifier that specifies which interface of the new server application component is to be used by the calling server application component to communicate with the new server application component. The "ppvObj" is a memory location in the calling server application component where a pointer to the specified interface is to be returned.

As discussed above, the transaction server executive 80 creates a new component context object to store the context of the new server application component. The transaction server executive 80 sets the client id and activity id to be the same as the calling server application component. If the calling server application component has a transaction, the transaction server executive also sets the transaction in the new component context object to be the same as that of the calling server application component unless the transaction attribute of the new server application component is registered in the catalog as not supported or requires new. If the calling server application component does not have a transaction and the new server application component's transaction attribute is required, the transaction server executive initiates an automatic transaction for the new server application component. The transaction server executive also initiates an automatic transaction if the transaction attribute is requires new.

TABLE 1

| IObjectContext::CreateInstance Return Values | |
|---|---|
| Value | Description |
| S_OK | A safe reference to the object was successfully returned. |
| REGDB_E_CLASSNOTREG | The specified component is not registered as a com object. |
| E_FAIL | A server failure occurred. |
| E_UNEXPECTED | An unexpected error occurred. |
| E_OUTOFMEMORY | There is not enough memory to instantiate the object |
| E_INVALIDARG | The argument passed in ppvObj is invalid. |

The SetComplete function is called by the server application component 86 on return from a client call to indicate that the component has completed processing the work requested by the client, and its state is not to be retained when returning from the method call that first entered the context (i.e., the method call from the client program). No action is taken until the component returns from the client's method call. On return from the client's method call, the transaction server executive 80 deactivates the component, causing its state to be destroyed. Any resources held by the component are released for other uses. By default, where the component has not called either SetComplete or SetAbort before return from the client's method call, the component's state is retained through a subsequent method call to the component. When the component is executing in the scope of a transaction, the server application component's call to SetComplete also indicates that the component agrees that its transactional updates can be committed. The SetComplete function returns a value to the caller (i.e., the component) as shown in the following table:

TABLE 2

IObjectContext::SetComplete Return Values

| Value | Description |
|---|---|
| S_OK | The component will be deactivated and its state destroyed upon its return from the client's method call. |
| S_FALSE | The server application component is not executing within a transaction. The server application component is still deactivated and its state destroyed upon return from the client's method call, but its work is not protected within a transaction. |
| E_SERVERFAIL | A server failure occurred. |
| E_UNEXPECTED | An unexpected error occurred. |

The SetAbort Function is called by the server application component 86 to indicate that the component has completed processing its work for the client, and its state is not to be retained when returning from the method call that first entered the context (i.e., the method call from the client program). As with the SetComplete function, no action is taken until the component returns from the client's method call. On return from the client's method call, the transaction server executive 80 deactivates the component, causing its state to be destroyed. Any resources held by the component are released for other uses. By default, where the component has not called either SetComplete or SetAbort before return from the client's method call, the component's state is retained through a subsequent method call to the component. When the component is executing in the scope of a transaction, the server application component's call to SetAbort also indicates that the component's transactional updates must be aborted. The SetAbort function returns a value to the caller (i.e., the component) as shown in the following table:

TABLE 3

IObjectContext::SetAbort Return Values

| Value | Description |
|---|---|
| S_OK | The component will be deactivated and its state destroyed upon its return from the client's method call. |
| E_FAIL | A server failure occurred. |
| E_UNEXPECTED | An unexpected error occurred. |

The ITransactionContext interface is an interface of the transaction context object (not shown). The server application component 86 also can create a transaction context object and use its ITransactionContext interface to initiate and control an independent transaction (i.e., independent from any transaction in which the server application component 86 participates), as well as create components to participate in the independent transaction. The illustrated ITransactionContext interface has the following form (in the C programming language):

```
DECLARE_INTERFACE_(ITransactionContext,
    IUnknown)
{
    //IUnknown functions
    HRESULT QueryInterface(THIS_REFIID riid,
        LPVOID FAR* ppvObj);
    ULONG AddRef(THIS);
    ULONG Release(THIS);
    //ITransactionContext functions
    HRESULT CreateInstance(THIS REFCLSID rcisid,
        REFIID riid, LPVOID FAR* ppvUnk);
    HRESULT Commit(THIS);
    HRESULT Abort(THIS);
};
```

The Create Instance function is called by the client program 134 to create a new server application component that participates in a transaction initiated and controlled by the client program 134. The new server application component inherits its context (i.e., client, activity and transaction) from the transaction context object. In its call, the client program 134 passes the parameters, "rcisid," "riid," and "ppvObj." The "rcisid" is a class identifier that specifies the new server application component to be created. The "rclsid" parameter is an interface identifier that specifies which interface of the new server application component is to be used by the client program to communicate with the new server application component. The "ppvObj" is a memory location in the client program where a pointer to the specified interface is to be returned.

As discussed above, the transaction server executive 80 creates a new component context object 138 to store the context of the new server application component. The transaction server executive 80 sets the client id and activity id of the new server application component to be the same as in the transaction context object. The transaction server executive 80 sets the transaction in the new server application component's context to be that of the transaction context object unless the new server application component's transaction attribute is registered as not supported or requires new in the catalog 136. If the new server application component's transaction attribute is requires new, then the transaction server executive 80 initiates an automatic transaction for the new server application component.

TABLE 4

ITransactionContext::CreateInstance Return Values

| Value | Description |
|---|---|
| S_OK | A safe reference to the object was successfully returned. |
| REGDB_E_CLASSNOTREG | The specified component is not registered as a com object. |
| E_FAIL | A server failure occurred. |
| E_UNEXPECTED | An unexpected error occurred. |

The client program 134 calls the Commit member function of the ITransactionContext interface to attempt to commit the transaction. In response, the transaction manager 148 commits the transaction if all participants (e.g., server application components and resource managers) in the transaction agree to committal. For example, the transaction will still abort if any server application component 86 participating in the transaction previously called the IObjectContext::SetAbort function, or on a failure (e.g., hardware failures such as a power outage, and software errors or exceptions) affecting any participant in the transaction.

TABLE 4

| ITransactionContext::Commit Return Values | |
| --- | --- |
| Value | Description |
| S_OK | The transaction was committed. |
| E_ABORTED | The transaction was aborted. |
| E_FAIL | A server failure occurred. |
| E_UNEXPECTED | An unexpected error occurred. |

The client program 134 calls the Abort member function of the ITransactionContext interface to cause the transaction to abort. In response, the transaction manager 148 aborts the transaction by rolling back work (e.g., database updates) by all participants in the transaction (i.e., returning to the pre-transaction state).

TABLE 4

| ITransactionContext::Abort Return Values | |
| --- | --- |
| Value | Description |
| S_OK | The transaction was aborted. |
| E_FAIL | A server failure occurred. |
| E_UNEXPECTED | An unexpected error occurred. |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A distributed object execution system for automatic transaction processing of server application components without explicit programming in the server application components to demarcate transaction scope, the system comprising:

a transactional attribute setting associated with a server application component, the setting representing a particular transactional behavior applicable to the server application component in the distributed object execution system, the particular transactional behavior being selected from a group of possible transactional behaviors; and a transaction service for causing work performed by the server application component to be processed in accordance with the particular transactional behavior represented by the transactional attribute.

2. The distributed object execution system of claim 1 further comprising:

an administrative utility having a user interface control for specifying the transactional attribute setting on a declarative basis at deployment of the server application component on the distributed object execution system.

3. The distributed object execution system of claim 1 further comprising:

an assembly tool for assembling the -server application component with other components into a collective deployment unit; and a user interface of the assembly tool accepting user input to specify the transactional attribute setting on a declarative basis at assembly of the server application component into the collective deployment unit.

4. The distributed object execution system of claim 1 further comprising:

a server application component editor for writing a declarative statement in the server application component to specify the transactional attribute setting on a declarative basis.

5. The distributed object execution system of claim 1 wherein the possible transactional behaviors include a requires transaction behavior to require processing of the server application component's work in a client's transaction, the distributed object execution system further comprising:

the transaction service operative when the transactional attribute setting represents the requires transaction behavior and a client of the server application component has a transaction to cause work performed by the server application component to be processed within a scope of the client's transaction.

6. The distributed object execution system of claim 1 wherein the possible transactional behaviors include a requires transaction behavior to require processing of the server application component's work in a transaction, the distributed object execution system further comprising:

the transaction service operative when the transactional attribute setting represents the requires transaction behavior and a client of the server application component has a transaction to cause work performed by the server application component to be processed within a scope of the client's transaction; and the transaction service operative when the transactional attribute setting represents the requires transaction behavior and a client of the server application component is without any transaction to cause work performed by the server application component to be processed within a scope of a new transaction.

7. The distributed object execution system of claim 1 wherein the possible transactional behaviors include a requires new transaction behavior to require processing of the server application component's work in a new transaction, the distributed object execution system further comprising:

the transaction service operative when the transactional attribute setting represents the requires new transaction behavior to cause work performed by the server application component to be processed within a scope of a new transaction regardless of whether a client of the server application component has a transaction.

8. The distributed object execution system of claim 1 wherein the possible transactional behaviors include a supports transaction behavior to permit processing of the server application component's work in a client's transaction, the distributed object execution system further comprising:

the transaction service operative when the transactional attribute setting represents the supports transaction behavior to cause work performed by the server application component to be processed within a scope of a client's transaction whenever a client of the server application component has a transaction.

9. The distributed object execution system of claim 1 wherein the possible transactional behaviors include a no transaction behavior to prohibit processing of the server application component's work in any transaction, the distributed object execution system further comprising:

the transaction service operative when the transactional attribute setting represents the no transaction behavior to cause work performed by the server application component to be processed outside any transaction even when a client of the server application component has a transaction.

10. A method of declaratively managing transactional work of server application objects in distributed object computing, the method comprising:

declaratively specifying a transactional rule applicable to a class of object in a server application; and at run-time of the server application, processing work of an object of the class in transactions according to the specified transactional rule.

11. The method of claim 10 further comprising:

deploying the server application on a networked computer; and performing the step of declaratively specifying the transactional rule on deployment of the server application on the networked computer.

12. The method of claim 10 further comprising:

displaying a user interface control of an object administration utility for setting a transactional attribute associated with the class, the transactional attribute designating the transactional rule applicable to the class; and setting a value of the transactional attribute in response to manipulation of the user interface control by a user to thereby declaratively specify the transactional rule.

13. The method of claim 10 further comprising:

assembling the class with a collection of other classes of objects in the server application into a package; and performing the step of declaratively specifying the transactional rule at assembly time of the package.

14. The method of claim 10 wherein the transactional rule is selected from a group including a requires transaction rule to require processing work of the class of objects within a client's transaction, the method further comprising:

when processing work of the object at run-time where the requires transaction rule has been declaratively specified as applicable to the class and a client of the class has a transaction, processing the object's work as part of the client's transaction.

15. The method of claim 14 further comprising:

when processing work of the object at run-time where the requires transaction rule has been declaratively specified as applicable to the class and a client of the class is without any transaction, processing the object's work as part of a new transaction.

16. The method of claim 10 wherein the transactional rule is selected from a group including a requires transaction rule to require processing work of the class of objects within a transaction, the method further comprising:

when processing work of the object at run-time where the requires transaction rule has been declaratively specified as applicable to the class and a client of the class has a transaction, processing the object's work as part of the client's transaction.

17. The method of claim 16 further comprising:

when processing work of the object at run-time where the requires transaction rule has been declaratively specified as applicable to the class and a client of the class is without any transaction, processing the object's work as part of a new transaction.

18. The method of claim 10 wherein the transactional rule is selected from a group including a requires new transaction rule to require processing work of the class of objects within a new transaction, the method further comprising:

when processing work of the object at run-time where the requires new transaction rule has been declaratively specified as applicable to the class, processing the object's work as part of a new transaction whether or not a client of the object has a transaction.

19. The method of claim 10 wherein the transactional rule is selected from a group including a supports transaction rule to support processing work of the class of objects within a client's transaction, the method further comprising:

when processing work of the object at run-time where the supports transaction rule has been declaratively specified as applicable to the class, processing the object's work as part of a client's transaction whenever the client of the object has a transaction.

20. The method of claim 10 wherein the transactional rule is selected from a group including a no transaction rule to prohibit processing work of the class of objects within a transaction, the method further comprising:

when processing work of the object at run-time where the no transaction rule has been declaratively specified as applicable to the class, processing the object's work outside of any transaction even if a client of the object has a transaction.

21. A computer-readable data storage medium having computer-executable program code stored thereon, the program codes when executed on a computer causing the computer to perform a method of declaratively managing transactional work of server application objects in distributed object computing; the method comprising:

storing a declaratively specified attribute in association with a class of object in a server application, said attribute denoting a transactional rule applicable to the class; and at run-time of the server application, processing work of an object of the class in transactions according to the specified transactional rule.

22. The computer-readable data storage medium of claim 21 wherein the method further comprises:

displaying a user interface control for receiving user input to set the transactional attribute associated with the class on deployment of the object on the computer; and setting a value of the transactional attribute in response to manipulation of the user interface control by a user to thereby declaratively specify the transactional rule.

23. The computer-readable data storage medium of claim 21 wherein the method further comprises:

assembling the class with a collection of other classes of objects in the server application into a package; and displaying a user interface control for receiving user input to set the transactional attribute associated with the class at assembly time of the package; and setting a value of the transactional attribute in response to manipulation of the user interface control by a user to thereby declaratively specify the transactional rule.

24. The computer-readable storage medium of claim 21 wherein the transactional rule is selected from a group including a requires transaction rule to require processing work of the class of objects within a client's transaction, the method further comprising:

when processing work of the object at run-time where the stored attribute denotes the requires transaction rule has been declaratively specified as applicable to the class and a client of the class has a transaction, processing the object's work as part of the client's transaction.

25. The computer-readable data storage medium of claim 24 wherein the method further comprises:

when processing work of the object at run-time where the stored attribute denotes the requires transaction rule has been declaratively specified as applicable to the class and a client of the class is without any transaction, processing the object's work as part of a new transaction.

26. The computer-readable data storage medium of claim 21 wherein the transactional rule is selected from a group including a requires transaction rule to require processing work of the class of objects within a transaction, the method further comprising:

when processing work of the object at run-time where the stored attribute denotes the requires transaction rule has been declaratively specified as applicable to the class and a client of the class has a transaction, processing the object's work as part of the client's transaction.

27. The computer-readable data storage medium of claim 26 wherein the method further comprises:

when processing work of the object at run-time where the stored attribute denotes the requires transaction rule has been declaratively specified as applicable to the class and a client of the class is without any transaction, processing the object's work as part of a new transaction.

28. The computer-readable data storage medium of claim 21 wherein the transactional rule is selected from a group including a requires new transaction rule to require processing work of the class of objects within a new transaction, the method further comprising:

when processing work of the object at run-time where the stored attributed denotes the requires new transaction rule has been declaratively specified as applicable to the class, processing the object's work as part of a new transaction whether or not a client of the object has a transaction.

29. The method of claim 21 wherein the transactional rule is selected from a group including a supports transaction rule to support processing work of the class of objects within a client's transaction, the method further comprising:

when processing work of the object at run-time where the stored attribute denotes the supports transaction rule has been declaratively specified as applicable to the class, processing the object's work as part of a client's transaction whenever the client of the object has a transaction.

30. The method of claim 21 wherein the transactional rule is selected from a group including a no transaction rule to prohibit processing work of the class of objects within a transaction, the method further comprising:

when processing work of the object at run-time where the stored attribute denotes the no transaction rule has been declaratively specified as applicable to the class, processing the object's work outside of any transaction even if a client of the object has a transaction.

31. A computer-readable data storage medium having a server application objects package stored thereon for deploying of the server application onto a computer with an automatic transaction processing system for automatically executing server application objects in transactions according to transactional rules, the server application objects package comprising:

program code for a collection of server application objects; and declarative configuration attributes associated with the server application objects, the attributes comprising a transactional attribute denoting a transactional rule applicable to a particular one of the server application objects whereby the automatic transaction processing system executes the particular server application object of the collection in accordance with the transactional rule denoted by the transactional attribute of the particular server application object.

32. The computer-readable data storage medium of claim 31 wherein the transactional attribute denotes a requires transaction rule by which the automatic transaction processing system executes the server application object in a transaction of a client of the server application object if the client has any such transaction, and otherwise executes the server application object in a new transaction.

33. The computer-readable data storage medium of claim 31 wherein the transactional attribute denotes a requires new transaction rule by which the automatic transaction processing system executes the server application object in a new transaction independent of whether a client of the server application component has any transaction.

34. The computer-readable data storage medium of claim 31 wherein the transaction attribute denotes a supports transaction rule by which the automatic transaction processing system executes the server application object in a transaction of a client of the server application object if the client has any such transaction, and otherwise executes the server application object without any transaction.

35. The computer-readable data storage medium of claim 31 wherein the transaction attribute denotes a no transaction rule by which the automatic transaction processing system executes the server application object without any transaction irrespective of whether a client of the server application object has any transaction.

36. An automatic transaction processing method comprising:

associating a transaction attribute with an object, the transaction attribute denoting a transaction processing mode applicable to the object;

commencing a new transaction for processing work of the object in accordance with the transaction processing mode;

processing work of the object within the new transaction; and upon completion of the object's work, causing completion of the new transaction to commence.

37. The automatic transaction processing method of claim 36 further comprising also processing work of other objects invoked by the object within the new transaction.

38. The automatic transaction processing method of claim 36 wherein completion of the new transaction comprises attempting to commit the transaction.

39. The automatic transaction processing method of claim 36 wherein completion of the new transaction comprises committing the new transaction if all work within a scope of the new transaction was successfully processed, and aborting the new transaction if any work within the new transaction's scope was not successfully processed.

40. The automatic transaction processing method of claim 36 wherein the step of causing completion of the new transaction to commence is performed upon the object returning from a client call after signaling completion of the object's work.

41. The automatic transaction processing method of claim 40 wherein the object signals completion of the object's work through a function call that indicates successful completion of the object's work.

42. The automatic transaction processing method of claim 41 further comprising attempting to commit the new transaction upon the object's return from the client call in response to the signal indicating successful completion of the object's work.

43. The automatic transaction processing method of claim 40 wherein the object signals completion of the object's work through a function call that indicates unsuccessful completion of the object's work.

44. The automatic transaction processing method of claim 43 further comprising aborting the new transaction upon the object's return from the client call in response to the signal indicating unsuccessful completion of the object's work.

45. A method of automatic transaction processing for distributed object server applications, comprising:
 at execution of an object, checking a transaction attribute associated with the object, the transaction attribute indicating a transactional rule applicable to the object; and
 processing work of the object within a transaction according to the transactional rule.

46. The method of claim 45 wherein the transactional rule indicates the object requires a new transaction in a particular circumstance, the method further comprising initiating a new transaction in a case where the object is in the particular circumstance and processing work of the object within the new transaction.

47. The method of claim 45 wherein the transactional rule indicates the object should participate in a client's transaction in a particular circumstance, the method further comprising processing work of the object within the client's transaction in a case where the object is in the particular circumstance.

48. The method of claim 45 wherein the transaction attribute is one of a not supported transaction attribute indicative of a first transactional rule that the object is not to have a transaction, a supported transaction attribute indicative of a second transactional rule that the object is to have a client's transaction in a circumstance where a client of the object has a transaction and otherwise is not to have a transaction, a required transaction attribute indicative of a third transactional rule that the object is to have a client's transaction in a circumstance where a client of the object has a transaction and otherwise is to have a new transaction, and a requires new transaction attribute indicative of a fourth transactional rule that the object is to have a new transaction regardless of whether a client of the object has a transaction.

49. The method of claim 45 wherein the step of checking the transaction attribute is performed upon instantiation of the object.

50. A computer-readable data storage medium having computer-executable program code stored thereon, where the program code comprises:
 code for checking, at execution of an object, a transaction attribute associated with the object, the transaction attribute indicating a transactional rule applicable to the object; and
 code for processing work of the object within a transaction according to the transactional rule.

51. The computer-readable data storage medium of claim 50 wherein the transactional rule indicates the object requires a new transaction in a particular circumstance, the program code further comprising code for initiating a new transaction in a case where the object is in the particular circumstance and processing work of the object within the new transaction.

52. The computer-readable data storage medium of claim 50 wherein the transactional rule indicates the object should participate in a client's transaction in a particular circumstance, the program code further comprising code for processing work of the object within the client's transaction in a case where the object is in the particular circumstance.

53. The computer-readable data storage medium of claim 50 wherein the transaction attribute is one of a not supported transaction attribute indicative of a first transactional rule that the object is not to have a transaction, a supported transaction attribute indicative of a second transactional rule that the object is to have a client's transaction in a circumstance where a client of the object has a transaction and otherwise is not to have a transaction, a required transaction attribute indicative of a third transactional rule that the object is to have a client's transaction in a circumstance where a client of the object has a transaction and otherwise is to have a new transaction, and a requires new transaction attribute indicative of a fourth transactional rule that the object is to have a new transaction regardless of whether a client of the object has a transaction.

54. The method of claim 50 wherein the code for checking the transaction attribute performs said checking upon instantiation of the object.

55. In a computer system, a method of controlling an execution environment for distributed object computing to provide automatic transaction processing, the method comprising:
 defining a group of transaction attributes to represent transactional rules applied by the execution environment for automatically managing transactional work by an object being executed within the execution environment; and
 assigning a desired transaction attribute selected from the group to an object whereby the execution environment automatically manages transactional work by the object according to the transactional rule represented by the object's transaction attribute upon execution of the object within the execution environment.

56. The method of claim 55 wherein the group comprises a not supported transaction attribute indicative of a transactional rule that the execution environment is to manage work of the object as outside of any transaction.

57. The method of claim 55 wherein the group comprises a supported transaction attribute indicative of a transactional rule that the execution environment is to manage work of the object as part of a client's transaction in a circumstance where a client of the object has a transaction and otherwise is to manage work of the object as outside of any transaction.

58. The method of claim 55 wherein the group comprises a required transaction attribute indicative of a transactional rule that the execution environment is to manage the object's work as part of a client's transaction in a circumstance where a client of the object has a transaction and otherwise is to manage the object's work as part of a new transaction.

59. The method of claim 55 wherein the group comprises a requires new transaction attribute indicative of a transactional rule that the execution environment is to manage the object's work as part of a new transaction regardless of whether a client of the object has a transaction.

60. A distributed object computing system for automatic transaction processing, the system comprising:

an object configuration database for storing transaction attributes associated to objects to be executed in the system, the transaction attributes notationally representing transactional rules applicable to the objects for processing work of the objects on a transactional basis; and an object execution service for causing an object to be executed on the system in accordance with the transactional rule represented by the object's associated transaction attribute.

61. The distributed object computing system of claim 60 wherein a notation of the transaction attributes by which the transactional rules are represented includes at least "not supported," "supported," "required," and "requires new" attribute names.

* * * * *

UNITED STATES PATENT AND TRADEMARK OFFICE
CERTIFICATE OF CORRECTION

PATENT NO.    : 6,678,696 B1
DATED         : January 13, 2004
INVENTOR(S)   : Helland et al.

It is certified that error appears in the above-identified patent and that said Letters Patent is hereby corrected as shown below:

Column 1,
Line 41, "Long" should read -- Log --.

Column 2,
Line 47, "J. Steinman." should read -- J. Steinman, --.

Column 9,
Line 58, "32=" should read -- 32 = --.

Column 20,
Line 5, "IsIn Transaction" should read -- IsInTransaction --.
Line 7, "Create Instance" should read -- CreateInstance --.
Line 51, "object" should read -- object. --.

Column 22,
Line 10, "rcisid" should read -- rclsid --.
Line 16, "Create Instance" should read -- CreateInstance --.
Line 22, "rcisid" should read -- rclsid --.
Line 23, "rcisid" should read -- rclsid --.

Column 24,
Line 6, "- server" should read -- server --.

Column 26,
Line 39 "computing;" should read -- computing, --.

Signed and Sealed this

Twenty-ninth Day of June, 2004

JON W. DUDAS
*Acting Director of the United States Patent and Trademark Office*